United States Patent [19]

Hibbs

[11] Patent Number: 4,652,193

[45] Date of Patent: Mar. 24, 1987

[54] ADHESIVELY SECURED ANCHOR

[76] Inventor: Jerry M. Hibbs, P.O. Box 16058, Des Moines, Iowa 50316

[21] Appl. No.: 826,075

[22] Filed: Feb. 3, 1986

[51] Int. Cl.$^4$ .......................... F16B 39/02; E04C 5/16
[52] U.S. Cl. ......................................... 411/82; 52/707
[58] Field of Search ..................... 52/704, 698, 707; 405/260, 261; 411/57, 63, 386, 538, 82

[56] References Cited

U.S. PATENT DOCUMENTS

| 2,092,341 | 9/1937 | De Vries | 52/704 |
| 4,193,715 | 3/1980 | Vass | 405/261 |
| 4,263,832 | 4/1981 | Lang et al. | 405/261 |
| 4,404,875 | 9/1983 | Sadanandan et al. | 405/261 |
| 4,419,805 | 12/1983 | Calandra, Jr. | 29/458 |
| 4,514,125 | 4/1985 | Stol | 411/82 |
| 4,518,292 | 5/1985 | Calandra, Jr. | 411/82 |

Primary Examiner—James L. Ridgill, Jr.
Attorney, Agent, or Firm—Henderson & Sturm

[57] ABSTRACT

Method and apparatus for anchoring an internally threaded shank member into a hole in concrete by using a capsule of epoxy. A chisel point on the anchor shank is utilized to break the capsule of epoxy in the hole in the concrete after a structure is attached to the top of the shank in a threaded fashion and rotated downwardly into the hole by an impact wrench or other rotary tool having an adjustably chuck attached thereto. A stop is provided on the structure connecting the power tool to the shank for preventing relative rotation in one direction of the shank with respect to the power tool once the threaded connector is adequately threaded into the shank the shank's internally threaded depression.

2 Claims, 6 Drawing Figures

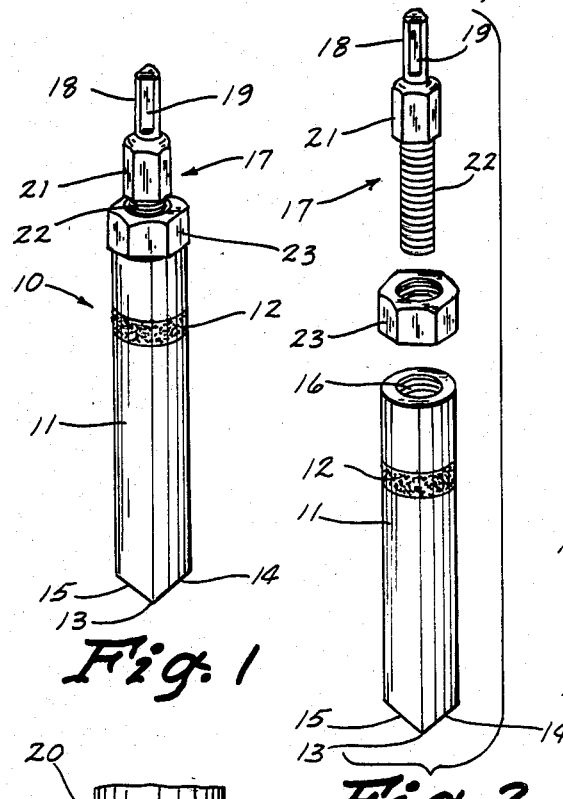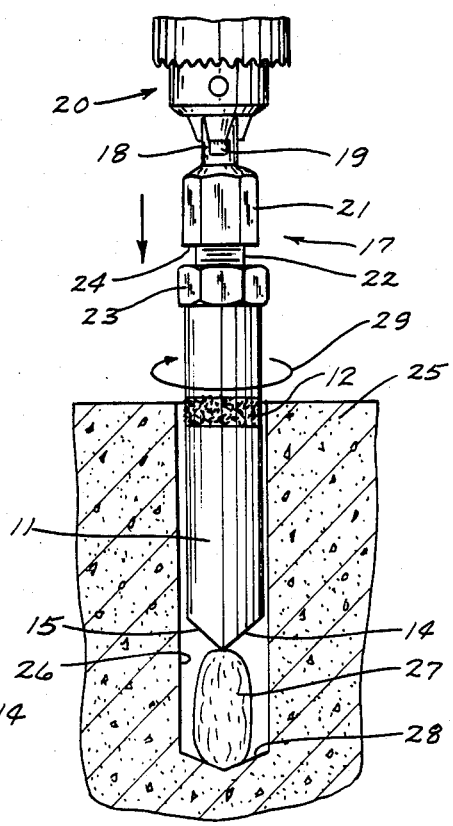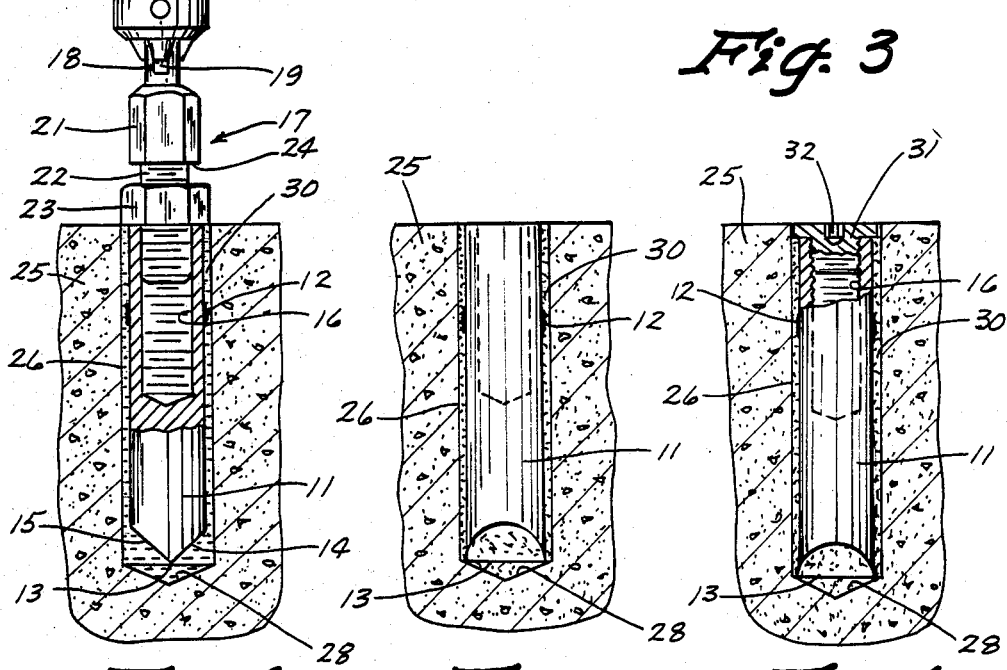

ADHESIVELY SECURED ANCHOR

TECHNICAL FIELD

The present invention relates generally to anchors to be secured in concrete and more particularly to an internally threaded insert for insertion into a pre-drilled hole in concrete which is held in place with epoxy.

BACKGROUND ART

Concrete structures are quite often utilized as a base or foundation for connecting an upstanding structure to the ground. Foundations for buildings and concrete bases for light poles or the like are but two examples of such concrete structures. Sometimes it is desired to use threaded fasteners which extend into the concrete and also extend outwardly from the concrete so that something can be threaded onto the concrete structure and be held firmly in place. These threaded structures can be inserted into the concrete when it is wet or the concrete can be poured around them. One of the problems with this method of attaching threaded fasteners or anchors to concrete is that it is time consuming to provide structures to hold them in place while the concrete cures, and also the concrete can extend into the threads, thereby preventing the threads from being used without extensive time and effort expended in cleaning the threads. Also, sometimes it is desired to attach structures to concrete which were not planned for at the time that the concrete was poured and therefore other methods of attaching or anchoring threaded fasteners thereto are needed.

Another way of attaching threaded fasteners to concrete is to drill a hole in the concrete and glue a threaded fastener into the hole, for example as shown in U.S. Pat. No. 4,263,832 to Lang. This Lang reference shows how to attach an externally threaded post to concrete but the prior art does not show a satisfactory method for installing an internally threaded anchor member into a hole in concrete. Accordingly, there is a need to solve this problem.

DISCLOSURE OF THE INVENTION

The present invention relates to a method and apparatus for anchoring an internally threaded shank member into a hole in concrete by using a capsule of epoxy. A chisel point on the anchor shank is utilized to break the capsule of epoxy in the hole in the concrete after a structure is attached to the top of the shank in a threaded fashion and rotated downwardly into the hole by an impact wrench or other rotary tool having an adjustable chuck attached thereto. A stop is provided on the structure connecting the power tool to the shank for preventing relative rotation in one direction of the shank with respect to the power tool once the threaded connector is adequately threaded into the shank's internally threaded depression.

An object of the present invention is to provide an improved threaded anchor for attachment to concrete.

Another object of the present invention is to provide an improved method and apparatus for installing an internally threaded anchor into a hole in concrete by use of a power tool and an epoxy capsule.

A further object of the present invention is to provide an anchor of the aforementioned type which will stay in place and resist pulling out of the hole in the concrete better than anchors previously known.

Still another object of the present invention is to provide an apparatus for a counter-sunk anchor having a cap therefor which is flush with the top of the hole in the concrete.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the present invention showing an anchor shank and an installation tool inserted in the top end thereof;

FIG. 2 is an exploded perspective view of the apparatus shown in FIG. 1;

FIG. 3 is a side elevational view of the shank and installation structure shown attached to a power tool such as an impact wrench or electric drill and showing a bore into a concrete surface and a capsule of epoxy prior to the rupture thereof;

FIG. 4 is a side elevational view like FIG. 3, but showing the anchor shank installed with the capsule ruptured and the installation tool still in place;

FIG. 5 is a view like FIG. 4, but showing the installation tool removed and the anchor shank securely glued in place in the concrete; and FIG. 6 is a view like FIG. 5, but showing an alternate form of the invention wherein the shank is counter-sunk into the concrete and a cap is threadably installed into the top thereof so that the cap is flush with the top surface of the concrete.

BEST MODE FOR CARRYING OUT THE INVENTION

Referring now to the drawings, wherein like reference numerals designate identical or corresponding parts throughout the several views, FIG. 1 shows an apparatus (10) constructed in accordance with the present invention. The apparatus (10) includes an anchor shank (11) having a roughened surface (12) approximately two-thirds the way up from the bottom thereof. The anchor shank (11) has a chisel tip (13) on the bottom thereof formed by two flattened surfaces (14 and 15). An internally threaded depression (16) is formed into the other end of the shank (11). An installation tool (17) includes a rod (18) having three flattened surfaces (19) thereon for attachment to a chuck (20), as shown in FIG. 3. A hexagonal portion for receiving a wrench (21) connects the rod (18) to a threaded shaft (22), which can be threadably received into the depression (16) in the top of the shank (11). A nut (23) is also threaded onto the threads of the threaded rod (22) as can readily be seen in FIGS. 1, 3 and 4.

In operation, the apparatus (10) can be installed in concrete (25) by first drilling a bore (26) in the concrete and then blowing the dust out of the bore (26). Then a capsule (27) of epoxy such as a MOLLY brand epoxy capsule M-22, for example, can be inserted into the bottom conical portion (28) of the bore (26). This capsule (27) has a liquid adhesive therein and a protective outer coating to prevent the liquid from escaping and hardening before it is desired to be used.

After the capsule (27) is in place as shown in FIG. 3, then a chuck (20) from an impact wrench or other tool for rotating the installation tool (17) is secured to the rods (18) in a well known manner. The tool (17) can first be installed by hand to the position shown in FIG. 1 or it can be rotated to this position by utilizing the power tool attached to the chuck (20), if desired. But once the installation tool (17) is so connected to the power tool and to the shank as shown in FIG. 3, then the power tool is actuated to rotate the apparatus (10) in the direction of the arrow (29) as shown in FIG. 3 while pushing down on the power tool. The chisel point (13) will act as a paddle to quickly rupture the capsule (27) as the shank (11) is rotated and pushed into the bore (26). The threaded member (22) will rotate down until an abutment (24) contacts the nut (23) and at such time the threaded member (22) is adequately installed into the internally threaded depression (16) and will then cause the rotation in the direction of the arrow (29).

Once the capsule (27) is broken, the liquid adhesive will flow to the spaces between the shank (11) and the walls of the bore (26) for example as shown in FIG. 4. Because the bottom of the bore (26) is conical and the tip (13) of the shank (11) is a chisel point, a well of adhesive will be in the conical portion and will form a better bond than if the tip (13) of the shank (11) was conical in shape, because a conical shape tip would push all the adhesive out of the bottom of the bore (26). Once the adhesive (26) within the capsule (27), which is numbered (30) in FIGS. 4–6, flows around the shank (11) and the shank (11) is fully inserted into bore (26), the power tool connected to the chuck (20) can be reversed and the threaded shaft (22) will come out of the depression (16) with the nut (23) attached thereto. The anchor shank (11) is then secured to the concrete (25) and threaded bolts or the like can be used to attach structures to the concrete.

Referring to FIG. 6, it is noted that the installation of the shank (11) shown therein is precisely like that of the FIG. 5 embodiment except that the bore (26) would need to be large enough to allow the nut (23) to extend down into the bore (26) to some extent so that the shank (11) can be counter-sunk to the position shown in FIG. 6. Then once the installation tool (17) is removed, a threaded cap (31) can be threadably attached to the threaded depression (16), as shown in FIG. 6, so that the top of the cap (31) is flush with the top surface of the concrete (25). An Allen wrench opening (32) is provided in the top of the cap (31) to facilitate easy removal of the cap or tightening down of the cap (31). When the cap is attached to the top of the depression (16) and shank (11), it will prevent water, moisture or dirt from entering the depression (16). This can be extremely valuable when a considerable time has passed between installation of the anchor shank (11) and the time that it is to be attached to a threaded fastener.

Accordingly, it will be appreciated that the preferred embodiments shown do indeed accomplish the aforementioned objects. Obviously, many modifications and variations of the present invention are possible in light of the above teachings. It is therefore to be understood that, within the scope of the appended claims, the invention may be practised otherwise than so specifically described.

I claim:
1. A fastener improvement consisting of
a solid material to be fastened having a bore formed in a face of the solid material, said bore having a mouth, an axially extending peripheral sidewall and a conically shaped floor;
a fastener having a shank with a longitudinal axis and a chisel tipped end on one end thereof and an internal female elongated threaded depression formed integrally on the other end thereof;
an adhesive capsule means including at least one thin-walled jacket encapsulating a respective quantum of adhesive, each capsule being deposited in said bore and supported on the floor of the bore just ahead of the chisel tipped end of the fastener for having the jacket ruptured by engagement with the chisel tipped end of the fastener so as to spread said adhesive into an interfacial fastening region that is defined between the fastener shank and said peripheral sidewalls of the bore;
a rod adapted to be attached by a chuck to power means for power rotation of said rod;
a threaded shaft means rigidly attached to said rod for threadably engaging the threaded depression in the other end of said fastener including hexagonally shaped means attached to said rod and to said threaded shaft for permitting a wrench to engage the hexagonally shaped means to thereby rotate the threaded shaft; and
stop means disposed on said shaft for preventing relative rotation of said threaded shaft means with respect to said fastener after said threaded shaft means has rotated a predetermined number of rotations into said depression, whereby once the threaded shaft means is securely rotated in one direction into said depression, continued rotation in said one direction will rotate the shank of the fastener and cause the chisel point to break the adhesive capsule means, said chuck can then be rotated in the other rotary direction by using the power means to remove the threaded shaft from said threaded depression; wherein, said stop means comprises an internally threaded nut in threaded engagement on said threaded shaft and an abutment means disposed between the rod and said nut whereby once the nut abuts said abutment means, the shaft will not go any further into the depression of said shank; and
a narrow annular band of roughened surface around an exterior wall of said shank for enhancing the bonding of the adhesive to the exterior of said shank.

2. The fastener improvement of claim 1; wherein said other end of the fastener is counter-sunk below the face of the solid material and a threaded cap is threadably engaged into the internal threads of the depression, said threaded cap being flush with said face of the solid material.

* * * * *